United States Patent
Cipollone et al.

(10) Patent No.: US 10,970,693 B2
(45) Date of Patent: Apr. 6, 2021

(54) SEMI-AUTOMATIC CONFIGURATION OF A SELF-SERVICE TERMINAL

(71) Applicant: NCR Corporation, Duluth, GA (US)

(72) Inventors: Stefano Cipollone, Milan (IT); Heather McCracken, Scotland (GB)

(73) Assignee: NCR Corporation, Atlanta, GA (US)

( * ) Notice: Subject to any disclaimer, the term of this patent is extended or adjusted under 35 U.S.C. 154(b) by 1289 days.

(21) Appl. No.: 14/229,272

(22) Filed: Mar. 28, 2014

(65) Prior Publication Data

US 2015/0278784 A1    Oct. 1, 2015

(51) Int. Cl.
 *G06Q 20/10*   (2012.01)
 *G06Q 20/18*   (2012.01)
 *G07F 19/00*   (2006.01)

(52) U.S. Cl.
 CPC ......... *G06Q 20/18* (2013.01); *G06Q 20/1085* (2013.01); *G07F 19/211* (2013.01)

(58) Field of Classification Search
 USPC .............................................. 705/39, 41, 44
 See application file for complete search history.

(56) References Cited

U.S. PATENT DOCUMENTS

| | | | | |
|---|---|---|---|---|
| 6,601,045 B1* | 7/2003 | DePietro | ............... | G07F 19/207 235/379 |
| 7,711,643 B2* | 5/2010 | Nielsen | ............... | G06Q 20/3221 705/43 |
| 2002/0099658 A1* | 7/2002 | Nielsen | ............... | G06Q 20/1085 705/43 |
| 2003/0204574 A1* | 10/2003 | Kupershmidt | ...... | H04L 41/0869 709/220 |
| 2005/0038747 A1* | 2/2005 | Drummond | ............. | H04L 67/02 705/43 |
| 2009/0159661 A1* | 6/2009 | Sanches | ................ | G07F 19/211 235/379 |
| 2009/0212104 A1* | 8/2009 | Smith | ....................... | G07F 7/04 235/379 |
| 2012/0278234 A1* | 11/2012 | Dent | ..................... | G07F 19/203 705/43 |
| 2015/0066761 A1* | 3/2015 | Chang | ................ | G06Q 20/1085 705/43 |
| 2015/0235190 A1* | 8/2015 | Urban | ................ | G06Q 20/1085 705/72 |

OTHER PUBLICATIONS

Multimedia kiosks in retailing Rowley, Jennifer. International Journal of Retail & Distribution Management; Bradford vol. 23, Iss. 5, (1995):1995.*
AT&T introduces Document Processing Automated Teller Machine Stellwag, Chris.Business Wire; New York [New York]Nov. 29, 1994: 1.1994.*
Technology Explosion Shapes Marketing's Future Bank Marketing; Washington vol. 24, Iss. 5, (May 1992): 24.1992.*

* cited by examiner

*Primary Examiner* — Hani M Kazimi
*Assistant Examiner* — Hatem M Ali
(74) *Attorney, Agent, or Firm* — Schwegman, Lundberg & Woessner

(57) ABSTRACT

Embodiments for providing Semi-Automatic ATM Configuration are generally described herein. In some embodiments, obtaining configuration connection details are obtained. The configuration connection details are used to connect to a configuration server and to configure a self-service terminal (SST).

3 Claims, 4 Drawing Sheets

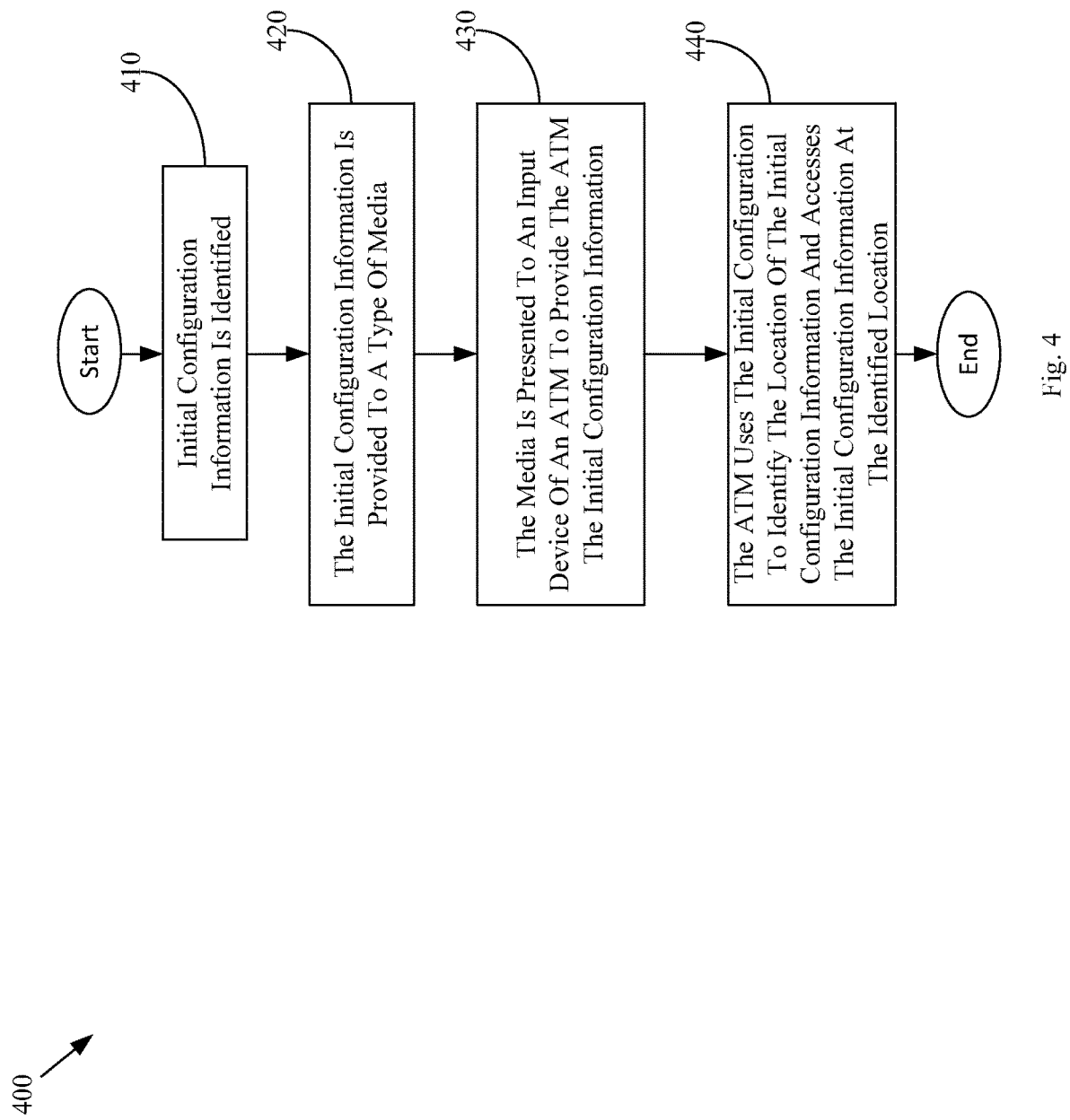

SEMI-AUTOMATIC CONFIGURATION OF A SELF-SERVICE TERMINAL

BACKGROUND

Increasingly consumers are conducting financial transactions through Self-Service Terminals (SSTs) without the assistance of a clerk. In fact, in many cases these transactions are conducted without any individual in the vicinity of the SSTs; other than, perhaps, a security camera integrated into the SSTs or in proximity to the SSTs. The most common SST transaction occurs by a customer at an Automated Teller Machine (ATM).

An ATM may be configured to self-configure as much as possible by requiring minimal information to enable it to communicate with a configuration server in the enterprise. Service personnel enter this information into the ATM that is being setup so that the ATM may use this information to access the configuration server to complete the configuration process. It is up to the service personnel to correctly entering this minimal information as efficiently and effectively as possible. However, manual human input at the time of installation is "lengthy" and error prone (e.g. inputting the data using the keyboard), which leads to extra time spent on installation and possibly further causing human error and frustration.

SUMMARY

In various embodiments, methods and a system for providing self-configuration of Self-Service Terminals (SST) are presented.

According to an embodiment, media is used to providing initial configuration information to an SST, such as an ATM. Specifically, in an embodiment, configuration connection details are obtained and the configuration connection details are used to connect to a configuration server and configure a self-service terminal (SST).

BRIEF DESCRIPTION OF THE DRAWINGS

FIG. 4 is a flow chart of the method for providing initial configuration information on media according to an embodiment.

DETAILED DESCRIPTION

Figure 1:
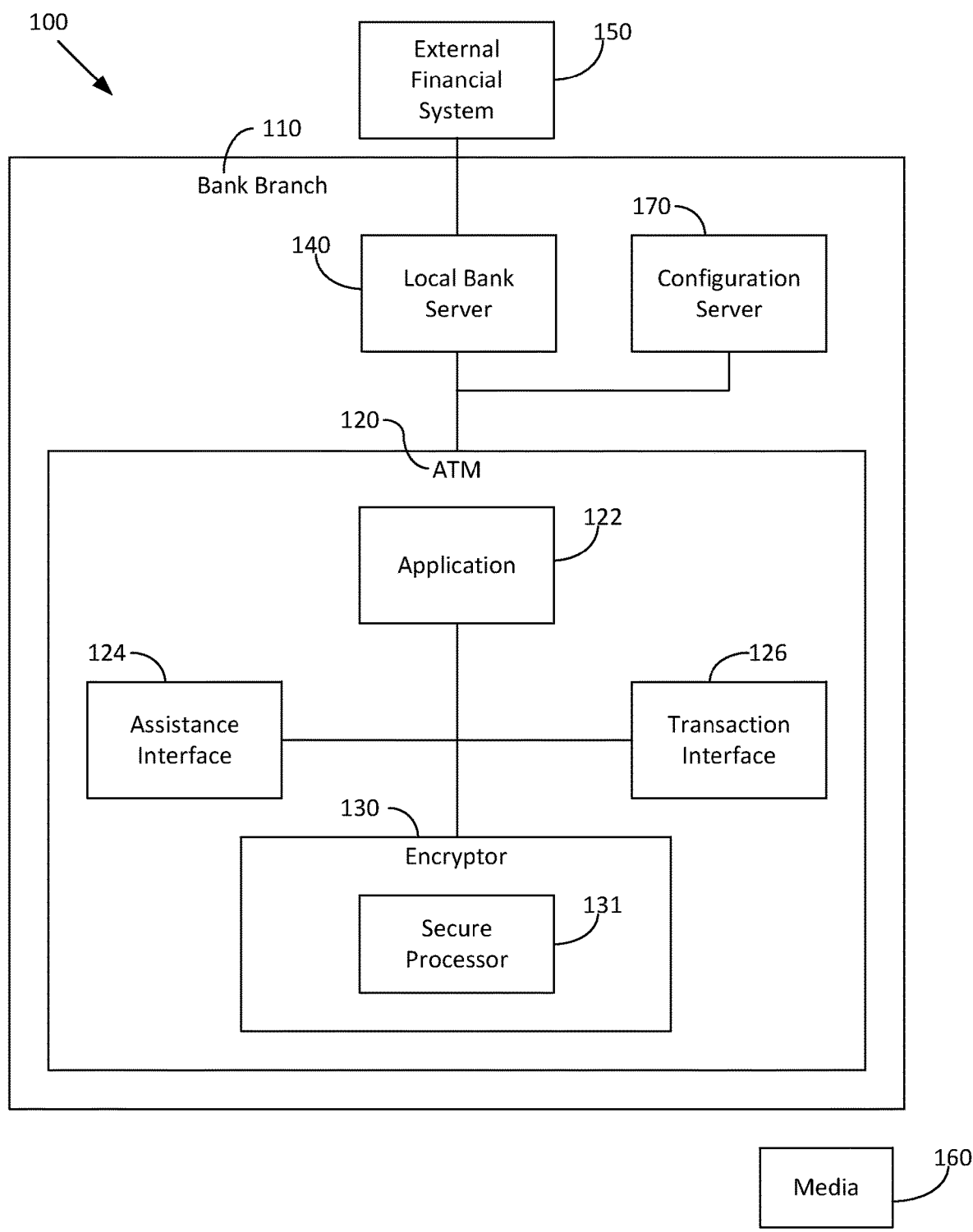
FIG. 1 is a diagram of an example architecture to enable inter-device Self-Service Terminal (SST) interactions, according to an example embodiment.

FIG. 1 is a diagram of an example architecture 100 to support Self-Service Terminal (SST) configuration processes, according to an example embodiment. The various components are illustrated and the arrangement of the components is presented for purposes of illustration only. It is to be noted that other arrangements with more or less components are possible without departing from the onsite automated customer assistance teachings presented herein and below.

The techniques, methods, and system presented herein and below for supporting SST configuration processes can be implemented in whole or in part in one, all, or some combination of the components shown with the architecture 100. The techniques and methods are programmed as executable instructions in memory and/or non-transitory computer-readable storage media and processed on one or more processors associated with the various components.

The discussion of the architecture 100 is within the context of a banking facility for banking transactions that may be made in person and at Automated Teller Machines (ATMs). It is noted that the architecture 100 is also applicable to any enterprise providing SSTs and in-person customer assistance. Thus, the description that follows below is but one embodiment and it not intended to limit embodiments to financial transactions at financial facilities.

The example architecture 100 includes a bank branch 110, an Automated Teller Machine (ATM) 120, a branch server 140, and an external financial system 150. The bank branch 110 includes the Automated Teller Machine (ATM) 120 operated by customers, and a branch server 140.

The ATM 120 includes an application 122 and an encryptor 130. The encryptor 130 may include a secure microprocessor 131. The ATM 120 is presented in greatly simplified form and is used to illustrate those portions of components modified for purposes of providing configuration processes. The application 122 includes an Application Programming Interface (API) for interacting with the encryptor 130 and the local bank server 140. The application 122 also includes a forward-facing Graphical User Interface (GUI and not shown in the FIG. 1) for interaction to perform configuration processes and to perform financial transactions with the external financial system 150. The encryptor 130 may be coupled to or integrated within the ATM 120 as an independent device. The coupling can be via a Universal Serial Bus (USB) port interface or other port interface. The encryptor 130 is accessible for interaction through the application 122 API. The secure microprocessor 131 houses cryptographic keys, certificates, and one or more cryptographic algorithms (functions). In some cases, the secure microprocessor 131 is pre-manufactured with the keys, certificates, and functions. In other cases, the keys, certificates, and functions may be installed on the secure microprocessor 131 by removing the encryptor 130 from the ATM 120 and interfacing the encryptor 130 to an independent secure device for installation and initial configuration.

The bank server 140 communicates with the ATM 120, which includes an application 122, an assistance interface 124, a transaction interface 126, a encryptor 130, and a secure processor 131. The interaction of the components is now discussed with an example configuration and operational scenario. It is noted that other scenarios are possible without departing from the beneficial teachings provided herein.

According to an embodiment, media 160 may be used to store information used to semi-automate the input of relevant information at a newly installed ATM 120, e.g., a physically installed ATM 120 on site rather than a software installed ATM. The ATM 120 may read the relevant, initial configuration information from the media 160 and connect to the correct configuration server 170 with the information for completing the self-configuration.

The ATM 120 seeks to self-configure as much as possible by requiring minimal information for the initial configuration information to enable the ATM 120 to communicate with the configuration server 170 in the enterprise or bank branch 110. By providing the initial configuration information on media 160 for semi-automating the configuration process, reduces time spent on installation and possible human error and frustration.

Figure 2:
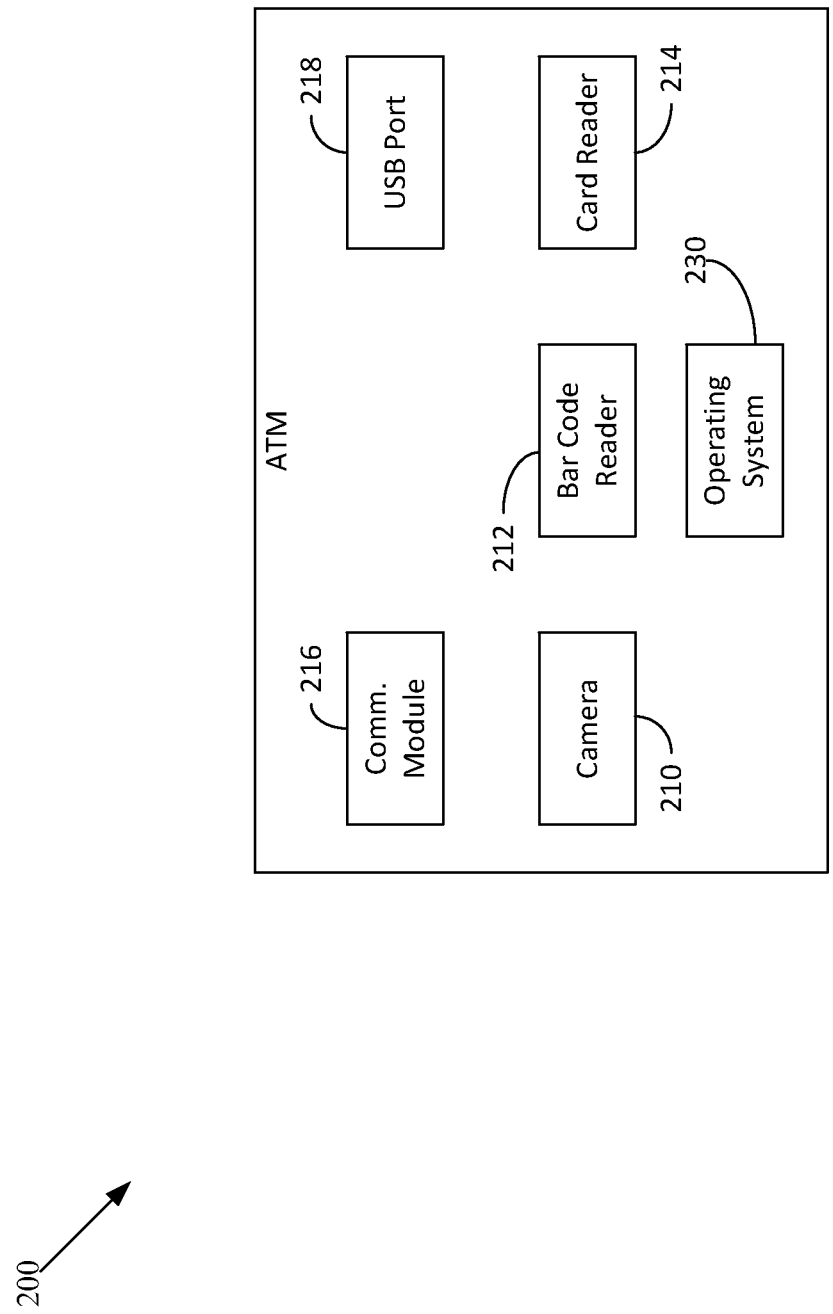
FIG. 2 illustrates an ATM according to an embodiment.

FIG. 2 illustrates an ATM 200 according to an embodiment. The ATM 200 may include a camera 210, a bar code reader 212, a card reader 214, a USB port 216 and a communications module 218. These media input devices 210-218 provide various options for the digital media to be used for providing the initial configuration information: The initial configuration information may be displayed as a barcode on a mobile phone (dynamically generated by a central location) and read by the camera 210 on the ATM 200. The initial configuration information may be stored on a magnetic stripe of a card that may be read by the ATM 200 using a card reader 214. A physical printed barcode could be used and read by the ATM camera 210 or bar code reader 212. A USB storage device (USB stick) may hold the initial configuration information and be coupled to a USB port 218 for reading by the operating system 230 of the ATM 200. Further, the initial configuration information may be transferred via a communications module 216, e.g., Bluetooth or NFC, wherein the initial configuration information may originally come from a central location.

Figure 3:
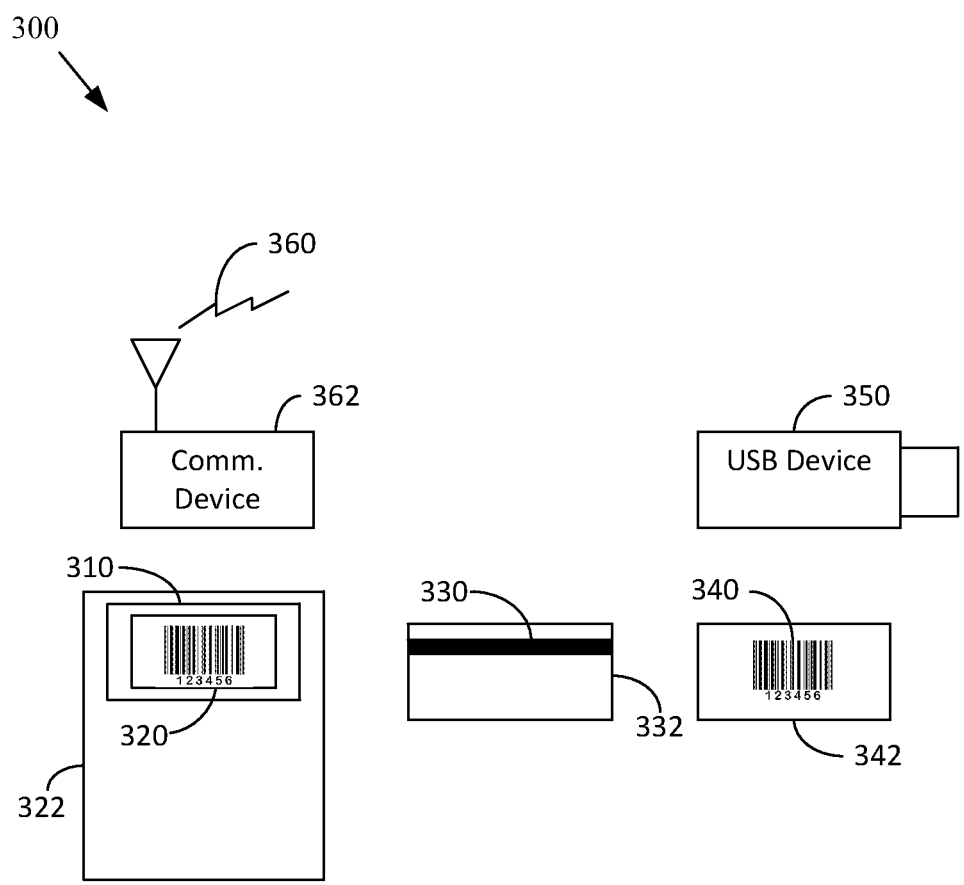
FIG. 3 illustrates the media used for providing initial configuration information according to an embodiment.

FIG. 3 illustrates the media used for providing initial configuration information 300 according to an embodiment. As shown in FIG. 3, the initial configuration information 310 may be displayed as a barcode 320 on a mobile phone 322, e.g., dynamically generated by a central location, and read by a camera. The initial configuration information may also be stored on a magnetic stripe 330 of a card 332 that may be read by the ATM using a card reader. A physical printed barcode 340, e.g., on paper 342, could be used and read by an ATM camera or bar code reader. A USB storage device (USB stick) 350 may hold the initial configuration information 310 and be coupled to a USB port for reading by the operating system of the ATM. Further, the initial configuration information 310 may be transferred via communications signals 360 from communications devices 362, which are then received by a communications module, e.g., Bluetooth or NFC.

FIG. 4 is a flow chart 400 of the method for providing initial configuration information on media according to an embodiment. In FIG. 4, initial configuration information is identified 410. The initial configuration information is provided to a type of media 420. The media is presented to an input device of an ATM to provide the ATM the initial configuration in formation 430. The ATM uses the initial configuration to identify the location of the initial configuration information and accesses the initial configuration information at the identified location 440.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method, comprising:
   providing executable instructions to a processor of a Self-Service Terminal (SST) from a non-transitory computer-readable storage medium causing the processor to perform operations comprising:
   obtaining configuration connection details by an input device of the SST, wherein obtaining further includes obtaining, by the input device of the SST, the configuration connection details directly from a second device that is independent of the SST, wherein the input device is a Near Field Communications (NFC) receiver;
   identifying a location from the configuration connection details that identifies for the SST a configuration server for obtaining configuration information to configure the SST, wherein the location is external to the SST;
   connecting the configuration server at the location to the SST by processing the configuration connection details;
   obtaining the configuration information from the configuration server while the SST is connected to the configuration server;
   processing the configuration information that configures the SST with the configuration information including configuring the SST for interaction with a local server and an external system and providing by processing the executable instructions a self-configuration of the SST; and performing transactions on the SST utilizing the configuration information.

2. A method, comprising:

providing executable instructions to a processor of a Self-Service Terminal (SST) from a non-transitory computer-readable storage medium causing the processor to perform operations comprising:

obtaining configuration connection details from media having the configuration connection details at an input device of the SST, wherein obtaining further includes obtaining, by the input device of the SST, the configuration connection details directly from a second device that is independent of the SST, wherein the input device is a Near Field Communications (NFC) receiver;

identifying a location from the configuration connection details that identifies a configuration server for obtaining configuration information to configure the SST, wherein the location is external to the SST;

connecting to the configuration server at the location to the SST by processing the configuration connection details, wherein the configuration server is located at a local bank branch that is local to the SST for obtaining the configuration information;

obtaining the configuration information from the configuration server while the SST is connected to the configuration server;

processing the SST the configuration information on the SST that configures the SST with the configuration information, wherein processing further configuring the SST with the configuration information for interaction with a local server and an external system, and providing by processing the executable instructions a self-configuration of the SST; and performing transactions on the SST utilizing the configuration information.

3. A Self-Service Terminal (SST), comprising:

a processor;

a non-transitory computer-readable storage medium having executable instructions representing application code; and the application executed by the processor from the non-transitory computer-readable storage medium causing the processor to perform operations comprising:

interacting with a dispenser;

obtaining configuration connection details from media read by an input device of the SST, wherein the input device is a Near Field Communications (NFC) receiver, wherein the input device obtains the configuration connection details directly from a second device that is independent of the SST;

identifying from the configuration connection details a location of a configuration server;

connecting to the configuration server associated with the location by processing using the configuration connection details;

obtaining configuration information from the configuration server while the SST is connected to the configuration server;

processing the configuration information to configure the SST with the configuration information and configure the SST for interaction with a local server and an external system, and provide a self-configuration of the SST by processing the configuration information; and performing transactions on the SST utilizing the configuration information.

* * * * *